US010584296B2

(12) United States Patent
Ranggård et al.

(10) Patent No.: US 10,584,296 B2
(45) Date of Patent: Mar. 10, 2020

(54) METHOD AND SYSTEM FOR ENERGY EFFICIENT TORREFACTION OF BIOMASS

(71) Applicant: BIOENDEV AB, Umeå (SE)

(72) Inventors: Jonas Ranggård, Umeå (SE); Ingemar Lindh, Umeå (SE); Martin Sjöström, Umeå (SE); Martin Strandberg, Umeå (SE); Anders Nordin, Umeå (SE); Erik Sandström, Sävar (SE)

(73) Assignee: BIOENDEV AB, Umea (SE)

( * ) Notice: Subject to any disclaimer, the term of this patent is extended or adjusted under 35 U.S.C. 154(b) by 9 days.

(21) Appl. No.: 15/544,952

(22) PCT Filed: Jan. 22, 2016

(86) PCT No.: PCT/SE2016/050036
§ 371 (c)(1),
(2) Date: Jul. 20, 2017

(87) PCT Pub. No.: WO2016/118067
PCT Pub. Date: Jul. 28, 2016

(65) Prior Publication Data
US 2017/0362524 A1  Dec. 21, 2017

(30) Foreign Application Priority Data

Jan. 23, 2015  (SE) ...................... 1550069

(51) Int. Cl.
*C10L 9/08* (2006.01)
*F23L 15/04* (2006.01)
(Continued)

(52) U.S. Cl.
CPC .............. *C10L 9/083* (2013.01); *C10L 5/442* (2013.01); *C10L 5/445* (2013.01); *F23G 7/10* (2013.01);
(Continued)

(58) Field of Classification Search
CPC ...................................................... C10L 9/083
See application file for complete search history.

(56) References Cited

U.S. PATENT DOCUMENTS

| 4,935,099 A * | 6/1990 | Weiss | C10B 53/02 201/27 |
| 2006/0199120 A1 * | 9/2006 | Kalina | F22B 35/002 431/9 |

(Continued)

FOREIGN PATENT DOCUMENTS

| EP | 1969099 | 9/2008 |
| EP | 2287278 | 2/2011 |

(Continued)

OTHER PUBLICATIONS

Extended European Search Report issued in EP 16 74 0473, dated Jun. 7, 2018, pp. 1-11.
(Continued)

*Primary Examiner* — Ellen M McAvoy
*Assistant Examiner* — Ming Cheung Po
(74) *Attorney, Agent, or Firm* — Jeffrey S. Melcher; Melcher Patent Law PLLC

(57) ABSTRACT

The present invention relates to a method and system for torrefaction of biomass and combustion of generated torrefaction gases. The torrefaction gases released from the biomass during the torrefaction reaction are withdrawn from the reactor and into a first burning zone. A secondary stream of air is introduced to the first burning zone to combust the torrefaction gases whereupon hot flue gases are obtained. Part of the hot flue gases are directed to a mixing unit. The rest of the hot flue gas is directed to a second burning zone for complete combustion of the flue gases. The fully combusted flue gases obtained in the second burning zone are directed to a heat recovery unit where the temperature of the flue gas is decreased. Part of the cold flue gases are directed
(Continued)

to the mixing unit where it is mixed with the hot flue gases such that a stream of cooled flue gases is obtained. The stream of the cooled flue gases are diverted into the torrefaction reactor for direct heating of the biomass.

8 Claims, 2 Drawing Sheets

(51) Int. Cl.
*F23G 7/10* (2006.01)
*C10L 5/44* (2006.01)

(52) U.S. Cl.
CPC ........... *F23L 15/04* (2013.01); *C10L 2290/02* (2013.01); *C10L 2290/06* (2013.01); *C10L 2290/08* (2013.01); *C10L 2290/24* (2013.01); *F23G 2201/10* (2013.01); *F23G 2206/10* (2013.01); *F23G 2209/26* (2013.01); *F23G 2900/00001* (2013.01); *Y02E 20/348* (2013.01); *Y02E 50/10* (2013.01); *Y02E 50/15* (2013.01); *Y02E 50/30* (2013.01)

(56) References Cited

U.S. PATENT DOCUMENTS

| | | |
|---|---|---|
| 2010/0242351 A1 | 9/2010 | Causer |
| 2012/0017499 A1* | 1/2012 | Leonhardt ............... C10B 49/02 44/606 |
| 2014/0026791 A1 | 1/2014 | Okazaki |
| 2014/0202073 A1 | 7/2014 | Leonhardt |

FOREIGN PATENT DOCUMENTS

| | | |
|---|---|---|
| WO | 2007/078199 | 7/2007 |
| WO | 2014/060437 | 4/2014 |
| WO | 2014060437 | 4/2014 |

OTHER PUBLICATIONS

International Search Report issued in PCT/SE2016/050036 dated Oct. 5, 2016, pp. 1-3.
Written Opinion issued in PCT/SE2016/050036 dated Oct. 5, 2016, pp. 1-8.
Berman, "Torrefaction for biomass co-firing in existing coal-fired power stations, Biocoal," ECN Report ECN-C-05-013: Energy research centre of the netherlands (ECN): Petten, The Netherlands, 2005; pp. 25-29.
Chinese Office Action issued in corresponding Chinese patent application serial No. 2016800174918, dated Aug. 1, 2019, pp. 1-11, partial translation pp. 1-3, and full translation pp. 1-17.

* cited by examiner

METHOD AND SYSTEM FOR ENERGY EFFICIENT TORREFACTION OF BIOMASS

TECHNICAL FIELD

The present invention relates to the field of torrefaction of biomass. In particular it relates to an energy efficient method and a system for torrefaction of a biomass.

BACKGROUND

To be able to compete with and replace fossil fuel energy carriers such as coal, oil and natural gas, lignocellulosic biomass would benefit from some form of pre-treatment method to overcome inherent drawbacks. The pre-treatment method torrefaction has been shown to improve biomass fuel qualities such as heating value, energy density, water content, milling characteristics, feeding and hydrophobic properties [1-4]. These improvements establish torrefaction as a key process in facilitating an expanding market for biomass raw materials. Torrefaction is a thermal pre-treatment method that normally takes place in a substantially inert (oxygen free) atmosphere at a temperature of about 220-600° C. During the process course a combustible gas comprising different organic compounds is released from the biomass feedstock in addition to the torrefied biomass.

The process of producing a torrefied material from lignocellulosic biomass can be said to include four stages:
1) a drying step, wherein free water retained in the biomass is removed;
2) a heating step in which physically bound water is released and the temperature of the material is elevated to the desired torrefaction temperature;
3) a torrefaction stage, in which the material is actually torrefied and which starts when the material temperature reaches about 220° C.-230° C. During this stage, the biomass partly decomposes and releases different types of volatiles, such as hydroxy acetone, methanol, propanal, short carboxylic acids and other hydro carbons. In particular, the torrefaction stage is characterized by decomposition of hemicellulose at temperatures from 220° C.-230° C., and at higher torrefaction temperatures cellulose and lignin also starts to decompose and release volatiles; cellulose decomposes at a temperature of 305-375° C. and lignin gradually decomposes over a temperature range of 250-500° C.;
4) a cooling step to terminate the process and facilitate handling. The torrefaction process is terminated as soon as the material is cooled below 220° C.-230° C.

SUMMARY OF THE PRESENT DISCLOSURE

Figure 1:
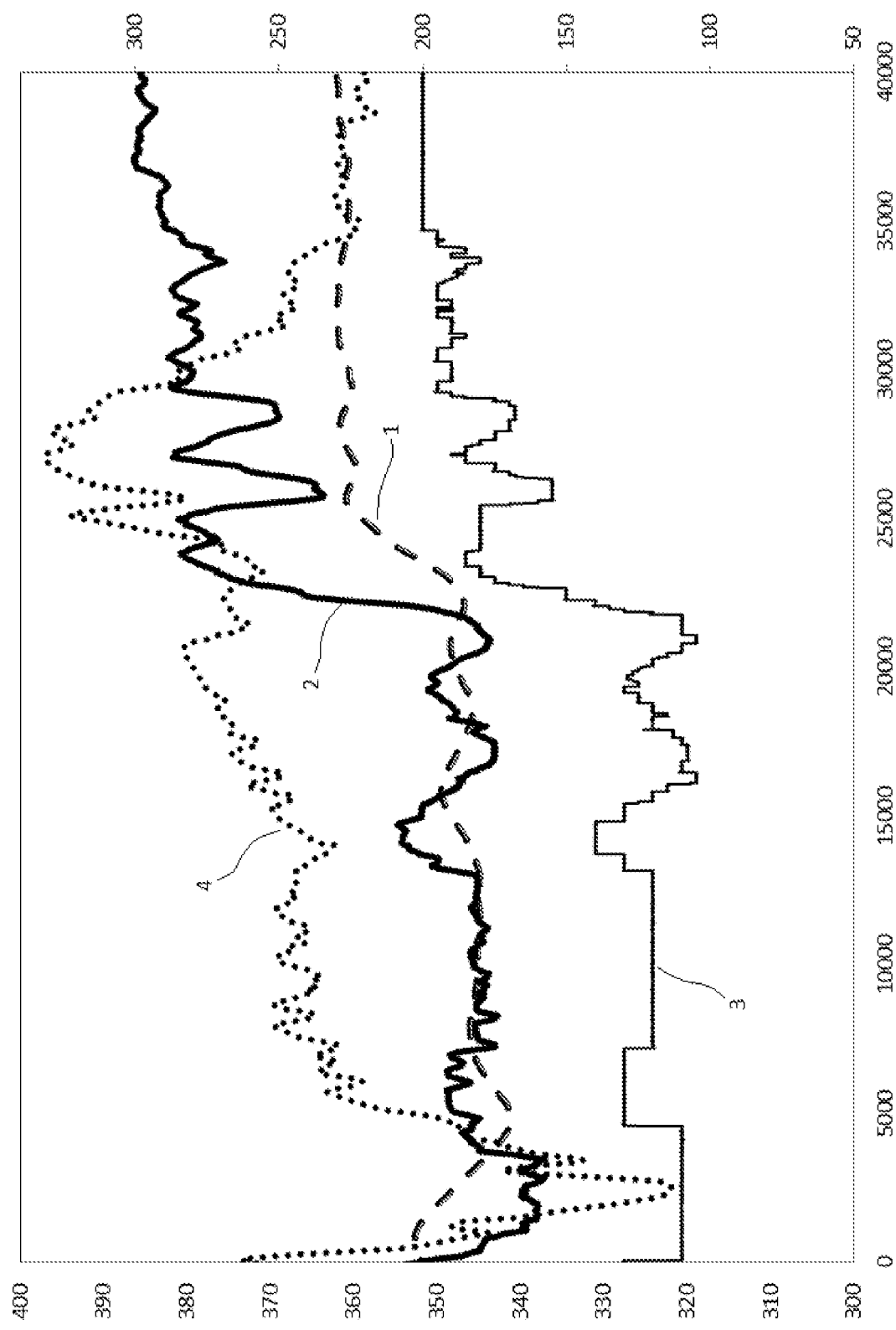
FIG. 1 shows a number of flows and temperatures during torrefaction using the present invention.

An energy efficient heating of the torrefaction reactor is an important factor for the production cost of torrefied biomass. It is well known in the art that torrefaction gas released from the biomass feedstock during the torrefaction process can be combusted and that the heat generated from the combustion can be used for heating of the torrefaction reactor. The present inventors have realized that a particularly energy efficient method for heating of the torrefaction reactor involves partly or full combustion of torrefaction gases such that hot flue gases (from partly or fully combusted torrefaction gases) are obtained, and heating the torrefaction reactor by directly introducing the hot flue gases within the reactor such that the biomass comes into direct contact with the hot flue gases. The present inventors have further realized that there are several challenges with using hot flue gases for direct heating of the biomass within the torrefaction reactor. For example it is important to be able to control that the oxygen level in the flue gas is not too high since this can lead to gas and/or dust explosions inside piping and vessels. It is also important to be able to control the temperature and flow of the flue gases and of the concentration of non-combusted torrefaction gas being re-introduced together with the flue gases. Furthermore, use of for example fans for circulating flue gases of high temperatures such as above of 850° C. is challenging. Such fans generally need to be cooled and such cooling can result in precipitation of compounds present in un-combusted torrefaction gas on cold surfaces in the fan.

The present inventors have invented a method and a system which effectively overcomes these challenges. Thus a first aspect of the present invention relates to a method for torrefaction of biomass and combustion of generated torrefaction gases comprising the steps of:

a) torrefaction of an optionally pre-dried biomass in a torrefaction reactor such that torrefied biomass and torrefaction gases are obtained b) withdrawal of torrefaction gases from the torrefaction reactor by means of an under pressure created by a primary stream of air flowing through an ejector burner and into a first burning zone, c) flowing a secondary stream of air into the first burning zone to at least partly combust the withdrawn torrefaction gases such that hot flue gases are obtained d) dividing the hot flue gases obtained in step c) into a first stream of hot flue gases and a second stream of hot flue gases by diverting a first stream of hot flue gases from the first burning zone to a gas mixing unit e) diverting the second stream of hot flue gases to a second burning zone f) flowing a tertiary stream of air, at or over stoichiometric oxygen rates, into the second burning zone to further combust the second stream of hot flue gases to obtain a stream of further combusted flue gases g) diverting the stream of further combusted flue gases to a heat recovery unit wherein the temperature of the stream of further combusted flue gases obtained in step f) is decreased such that a stream of cold flue gases is obtained h) diverting a part of the cold flue gases obtained in step g) to the gas mixing unit such that the stream of cold flue gases mixes with the first stream of hot flue gases such that a stream of partially cooled flue gases is obtained i) diverting the stream of partially cooled flue gases obtained in step h) into the torrefaction reactor such that the optionally predried biomass comes into direct contact with the said stream of partially cooled flue gases such that the optionally predried biomass is directly heated by the stream of partially cooled flue gases A second aspect of the invention relates to a system for torrefaction of biomass and combustion of generated torrefaction gases comprising i) a torrefaction reactor for torrefying an optionally pre-dried biomass having
  a biomass inlet and a biomass outlet wherein biomass can be transported from the biomass inlet to the biomass outlet in a biomass transport direction during a torrefaction process, at least one outlet for torrefaction gases, and
at least one inlet for hot flue gases leading in to the torreaction reactor such that hot flue gas entering the said inlet can come into direct contact with biomass present within the torrefaction reactor ii) an ejector burner comprising
an inlet for torrefaction gases
an inlet for primary air, and
an outlet for an air/torrefaction gas mixture
wherein the said inlet for torrefaction gas of the ejector burner is connected to the outlet for torrefaction gas of the torrefaction reactor such that torrefaction gas can be withdrawn from the torrefaction reactor to the ejector burner and be mixed with primary air within the ejector burner.

iii) a first burning zone located immediately downstream of the outlet for an air/torrefaction gas mixture of the ejector burner such that the air/torrefaction gas mixture can flow through the ejector burner into the first burning zone and wherein the first burning zone comprises
a first outlet for hot flue gases and
a second outlet for hot flue gases, and
an inlet for secondary air iv) a second burning zone having;
an inlet for hot flue gases connected to the second outlet for hot flue gases of the first burning zone
an inlet for tertiary air, and
an outlet for further combusted flue gases v) a heat recovery unit having an inlet connected to the outlet for further combusted flue gases of the second burning zone and an outlet for cold flue gases vi) a gas mixing unit for mixing of hot flue gases withdrawn from the outlet for hot flue gases of the first burning zone with cold flue gases withdrawn from the outlet for cold flue gases of the heat recovery unit wherein said gas mixing unit comprises
an inlet for cold flue gases connected to the outlet for cold flue gases of the heat recovery unit
an inlet for hot flue gases connected to the first outlet for hot flue gases of the first burning zone
an outlet for hot flue gases connected to the at least one inlet for hot flue gases of the torrefaction reactor

LIST OF REFERENCE NUMBERS USED IN THE FIGURES

1. Torrefaction reactor
2. Biomass inlet
3. Biomass outlet
4. Outlet for torrefaction gases
5a) Inlet for partially cooled flue gases
5b) Inlet for partially cooled flue gases
5c) Inlet for partially cooled flue gases
6) Ejector burner
7) Inlet for torrefaction gases
8) Inlet for primary air
9) Outlet for an air/torrefaction gas mixture
10) First burning zone
11) Burning chamber
12) First outlet for hot flue gases
13) Second outlet for hot flue gases
14) Inlet for secondary air
15) Second burning zone
16) Inlet for hot flue gases
17) Inlet for tertiary air
18) Outlet for further combusted flue gases
19) Boiler (heat recovery unit)
20) Boiler inlet
21) Outlet for cold flue gases
22) Gas ejector (mixing unit)
23) Fan
24) Inlet for cold flue gases
25) Inlet for hot flue gases of gas ejector
26) Outlet for partially cooled flue gases of gas ejector
27) Oxygen supply means
28) Air pre-heater
29) Flue gases to chimney
30) Biomass dryer
31) Air Fan
32) Biomass into dryer
33) Biomass out of dryer
34) heat transferring media into boiler
35) heat transferring media out of boiler
36) heat transferring media into biomass dryer
37) heat transferring media out of biomass dryer
38) Air to air pre heater
39) Air to air fan
40) Propane inlet Detailed Description The present invention relates to a method and system for torrefaction of biomass and combustion of generated torrefaction gases. According to the present invention, the torrefaction gases released from the biomass during the torrefaction reaction are withdrawn from the torrefaction reactor by means of an under pressure created by a primary stream of air flowing through an ejector burner and into a first burning zone. A secondary stream of air is introduced to the first burning zone to combust the torrefaction gases at under stoichiometric oxygen conditions whereupon hot flue gases are obtained. Part of the hot flue gases are there after directed to a mixing unit, such as a gas ejector, where it will be mixed with cold flue gases to partly cool the hot flue gases from the first burning zone before it is directed to the torrefaction reactor for direct heating of the biomass present within the reactor. The rest of the hot flue gas is directed to a second burning zone for complete combustion of the flue gases by introduction of a third stream of air at or over stoichiometric oxygen conditions. The fully combusted flue gases obtained in the second burning zone are directed to a heat recovery unit, such as a boiler, where heat is recovered and the temperature of the flue gas is decreased to about 60-300° C. Part of this cold flue gas is used for cooling, flowing and/or forcing hot flue gases in to the torrefaction reactor by flowing the said cold flue gases in to the mixing unit where it is mixed with the hot flue gases. The cold flue gases can for example be directed to the mixing unit by means of a fan. Since the cold flue gas is fully combusted, i.e. virtually devoid of non-combusted torrefaction gas, the invention solves the problem with fouling of the fan due to condensation of torrefaction gases. Furthermore, the fan does not need to operate at high temperatures which would have been the case if hot flue gas was used for driving the flow of gas in the system instead of cold flue gas. The present invention also has several other advantages. For example the temperature, oxygen rate and flow of the hot flue gases entering the torrefaction reactor can be controlled by adjusting a flow of air into the first and/or second burning zone.

Thus, a first aspect of the present invention relates to a method for torrefaction of biomass and combustion of generated torrefaction gases comprising the steps of:

a) torrefaction of an optionally pre-dried biomass in a torrefaction reactor such that torrefied biomass and torrefaction gases are obtained b) withdrawal of torrefaction gases from the torrefaction reactor by means of an under pressure created by a primary stream of air flowing through an ejector burner and into a first burning zone, c) flowing a secondary stream of air into the first burning zone to at least partially combust the withdrawn torrefaction gases such that hot flue gases are obtained d) dividing the hot flue gases obtained in step c) into a first stream of hot flue gases and a second stream of hot flue gases by diverting a first stream of hot flue gases from the first burning zone to a gas mixing unit e) diverting the second stream of hot flue gases to a second burning zone f) flowing a tertiary stream of air, at or over stoichiometric oxygen rates, into the second burning zone to further combust the second stream of hot flue gases to obtain a stream of further combusted flue gases g) diverting the stream of further combusted flue gases to a heat recovery unit wherein the temperature of the stream of further combusted flue gases obtained in step f) is decreased such that a stream of cold flue gases is obtained h) diverting a part of the cold flue gases obtained in step g) to the gas mixing unit such that the stream of cold flue gases mixes with the first stream of hot flue gases such that a stream of partially cooled flue gases is obtained i) diverting the stream of partially cooled flue gases obtained in step h) into the torrefaction reactor such that the optionally pre-dried biomass comes into direct contact with the said stream of partially cooled flue gases such that the optionally pre-dried biomass is directly heated by the stream of partially cooled flue gases.

The heating of the biomass in step i) will contribute to the torrefaction of the biomass present in the torrefaction reactor. The torrefaction gas released by the torrefaction process will then be withdrawn together with the hot flue gases and be combusted in the burning zones. It is therefore beneficial that the flue gases are not too diluted. Therefore it can be beneficial if it is possible to control the process such that the stream of partially cooled flue gases obtained in step h) is not fully combusted but comprises some amount of non-combusted torrefaction gas. It is also beneficial to be able to control the temperature and the oxygen level of the stream of partially cooled flue gases. This can be achieved in the method according to the present invention by controlling the temperature of the hot flue gases obtained in step c) which in turn can be achieved by controlling the flow of the secondary stream of air into the first combustion zone and/or controlling the flow of the tertiary stream of air into the second combustion zone. This flow can also control to which extent the torrefaction gases are combusted. In most cases it is desirable that the torrefaction gases are not completely combusted in step c) to prevent the combustible mixture of torrefaction and flue gases is the system from being too diluted. In most cases it is also desirable that the partly cooled flue gas flowing into the torrefaction reactor in step i) has the highest possible temperature since it also prevents the combustible mixture of torrefaction and flue gases is the system from being too diluted. A too diluted torrefaction and flue gas mixture may be hard to combust due to the lack of combustible products. It is known that gas mixtures with adiabatic flame temperatures below 1500° C. are hard to combust completely. The temperature of the partially cooled flue gas can be controlled by controlling the flow of cold flue gases into the gas mixing unit. It is also possible to control the amount of oxygen present in the partially cooled flue gases in the same way. This is beneficial since the cold flue gases can contain oxygen levels which are too high and might lead to risks of explosions in the torrefaction reactor. The oxygen levels in the partially cooled flue gases can be decreased by decreasing the flow of cold flue gas into the gas mixing unit. The excess of oxygen present in the cold flue gas will then be combusted in the mixing unit as it comes into contact with sufficient amounts of not fully combusted hot flue gases generated in step c).

A complete combustion in step c) also rely on that at least stoichiometric amounts of oxygen is added in step c). This increases the risk that the oxygen concentration in the stream of partially cooled flue gases introduced in the torrefaction reactor will be to high which increases the risk of explosions. Therefore, in a preferred embodiment the combustion in step c) is performed at sub-stoichiometric oxygen rates. In embodiment the lambda value of the hot flue gases obtained in step c) is 0.5-0.8.

The present inventors have discovered that it is beneficial to be able to add controlled amounts of additional/auxiliary (in solid, fluid, or gaseous form) fuel to the first burning zone which facilitates more control of the lambda value of the hot flue gases obtained in step c) and also better control of the combustion temperature of the flue gases obtained in step c). The optional addition of auxiliary fuel also makes it easier to control the temperature in the torrefaction reactor. The use of additional fuel may also be used in the upstart phase of the torrefaction system for pre-heating. In one embodiment the additional/auxiliary fuel is gaseous. In a preferred embodiment the gaseous auxiliary fuel is added to the torrefaction gas stream obtained in step b) before entering the ejector burner.

In one embodiment, the hot flue gases obtained in step c) have a temperature of above 850° C. such as above 900° C., such as above 1000° C., such as 850° C.-1320° C. In a preferred embodiment the combustion in step c) is. In one embodiment the cold flue gases obtained in step g) has a temperature of 60-300° C. In one embodiment the stream of partially cooled flue gases obtained in step h) has a temperature of 600-1000° C. In one embodiment the torrefaction gas present in the hot flue gases obtained in step c) is completely combusted in step f).

The present inventors have discovered that a more efficient heating of the biomass can be achieved if the primary stream of air is pre-heated to at least 250° C.; the secondary stream of air is pre-heated to at least 450° C. and the tertiary stream of air is pre-heated to at least 400° C. Therefore, in one embodiment the temperature of the primary stream of air is pre-heated to at least 250° C. prior to step b), preferably 350° C.-550° C. In one embodiment the temperature of the secondary stream of air is pre-heated to at least 450° C., preferably 550° C.-700° C. prior to step c). In one embodiment the temperature of the tertiary stream of air is pre-heated to at least 400° C., preferably 500° C.-600° C. prior to step f).

In one preferred embodiment, the primary stream of air, the secondary stream of air and/or the tertiary stream of air are pre-heated in an air heater located downstream of the second burning zone but upstream of the heat recovery unit wherein the air is heated using heat energy from the stream of further combusted flue gases obtained in step f). In one embodiment the air heating unit is of tubular type. In one embodiment the air heating unit comprise tubes and the stream of further combusted flue gases generated in step f) is flowing inside the tubes and the primary stream of air, the secondary stream of air and/or the tertiary stream of air is is flowing outside the tubes such that it is preheated by the stream of further combusted flue gases.

In one embodiment the gas mixing unit is a gas ejector. In one embodiment the cold flue gases is directed to the gas mixing unit via a fan arranged in between the outlet for cold flue gases of the heat recovery unit and the gas mixing unit. Thereby the fan only comes into contact with cold flue gas virtually devoid of torrefaction gases. Thereby problems with fouling of the fans due to condensation of torrefaction gases can be avoided as well as problems related to overheating of the fans. In one embodiment the gas mixing unit is protected by the high gas temperature by ceramic lining on the inside. In one embodiment the gas mixing unit and downstream piping is protected from excessive temperatures by direct water spray injection.

The part of the cold flue gas which is not used for driving the flow of hot flue gases to the torrefaction reactor has to be released from the system. This can for example be achieved by releasing the flue gas via a chimney. Thus, in one embodiment the cold flue gases obtained in step g) are diverted to a chimney.

Most torrefaction processes are preceded by a drying step wherein the moisture content of the biomass is reduced. This is an energy demanding step and the present inventors have realized that the energy recovered in the heat recovering unit can be used in the drying process. Thus, in one embodiment the method further comprises a step of pre-drying the biomass in a pre-drier prior to step a) and heat energy is recovered in step d) and at least part of said heat energy is used for pre-drying the biomass in the pre-drier. In one embodiment the residual energy in at least part of the cold flue gases obtained in step g) are used to pre-dry the biomass.

In one embodiment the torrefied biomass obtained in step a) is cooled to a temperature below 200° C. in a cooling device.

The present inventors have discovered that it is easier to control the torrefaction temperature within the torrefaction reactor if the stream of partially cooled flue gases obtained in step h) is introduced to the torrefaction reactor both in an upstream part of the reactor, in relation to the biomass flow; and to a downstream part of the reactor and if the torrefaction gases are withdrawn at a position in between these two positions. Thus, in one embodiment step i) comprises that the stream of partially cooled flue gases obtained in step h) is introduced at a first position located in the upstream region of the torrefaction reactor and to a second region located in the downstream part of the torrefaction reactor and wherein the torrefaction gases withdrawn in step b) are withdrawn from a position in between the said first position and the said second position. For example the said first position can be located in the first quarter of the torrefaction reactor and the second position can be located in the last quarter of the torrefaction reactor. The torrefaction gases can for example be withdrawn from a position corresponding to somewhere in the second third of the torrefaction reactor.

In another embodiment the stream of partially cooled flue gases obtained in step h) can be introduced in a first region in multiple positions located in the upstream region of the torrefaction reactor and/or in multiple positions in a second region located in the downstream part of the torrefaction reactor and wherein the torrefaction gases withdrawn in step b) are withdrawn from a position in between the said first region and the said second region.

The present inventors have previously demonstrated that the temperature in the torrefaction reactor can be controlled by introducing controlled amounts of oxygen to the torrefaction reactor, see WO12158118 and that the oxygen containing gas preferably should be added such that the oxygen containing gas is drawn counter currently to the biomass transport within the torrefaction reactor. Therefore, in one embodiment a controlled amount of an oxygen containing gas is added to partially cooled flue gases obtained in step h) such that oxygen enriched partially cooled flue gas is obtained and the said oxygen enriched partially cooled flue gas is thereafter introduced at the second region in one or multiple positions. In one embodiment partially cooled flue gases obtained in step h) without added oxygen containing gas is introduced at the first position or region. In one embodiment the oxygen containing gas is air.

In one embodiment the torrefaction of an optionally pre-dried biomass in a torrefaction reactor in step a) is performed at a temperature of 220-450° C., preferably 230-400° C., preferably 270-360° C., most preferably 300-360° C. In one embodiment the biomass is lignocellulosic biomass. In one embodiment the lignocellulosic biomass is a plant material such as an agriculture residue or a forestry residue. In one embodiment the plant material is as a wood material, such as soft wood or hard wood. In one embodiment the wood material is wood chips. In one embodiment the wood chips is in between 1 and 10 cm across in size. In one embodiment the lignocellulosic biomass is peat or bark. In one embodiment the biomass is selected from spruce, eucalyptus, reed canary grass, straw, birch, pine and/or alder.

A second aspect of the invention relates to a system for torrefaction of biomass and combustion of generated torrefaction gases comprising i) a torrefaction reactor for torrefying an optionally pre-dried biomass having a biomass inlet and a biomass outlet wherein biomass can be transported from the biomass inlet to the biomass outlet in a biomass transport direction during a torrefaction process, at least one outlet for torrefaction gases, and at least one inlet for hot flue gases leading into the torreaction reactor such that hot flue gas entering the said inlet can come into direct contact with biomass present within the torrefaction reactor ii) an ejector burner comprising an inlet for torrefaction gases an inlet for primary air, and an outlet for an air/torrefaction gas mixture wherein the said inlet for torrefaction gas of the ejector burner is connected to the outlet for torrefaction gas of the torrefaction reactor such that torrefaction gas can be withdrawn from the torrefaction reactor to the ejector burner and be mixed with primary air within the ejector burner.

iii) a first burning zone located immediately downstream of the outlet for an air/torrefaction gas mixture of the ejector burner such that the air/torrefaction gas mixture can flow through the ejector burner into the first burning zone and wherein the first burning zone comprises a first outlet for hot flue gases and a second outlet for hot flue gases, and an inlet for secondary air iv) a second burning zone having;

an inlet for hot flue gases connected to the second outlet for hot flue gases of the first burning zone an inlet for tertiary air, and an outlet for further combusted flue gases v) a heat recovery unit having an inlet connected to the outlet for further combusted flue gases of the second burning zone and an outlet for cold flue gases vi) a gas mixing unit for mixing of hot flue gases withdrawn from the outlet for hot flue gases of the first burning zone with cold flue gases withdrawn from the outlet for cold flue gases of the heat recovery unit wherein said gas mixing unit comprises
   an inlet for cold flue gases connected to the outlet for cold flue gases of the heat recovery unit
   an inlet for hot flue gases connected to the first outlet for hot flue gases of the first burning zone
   an outlet for partially cooled flue gases connected to the at least one inlet for partially cooled flue gases of the torrefaction reactor The first burning zone and the second burning zone can for example constitute separate burning chambers. However it is also possible that both burning zones can be placed in a single burning chamber. In the latter case the burning chamber may be elongated and the two burning zones might be separated by for example a constriction. In one embodiment the first burning zone is a first burning chamber and the second burning zone is a second burning chamber. In another embodiment the first burning zone and the second burning zone are both present in a common burning chamber. In one embodiment the system is further comprised of an air pre-heater for heating the primary, secondary and/or tertiary air and said air pre-heater is located in between the second burning zone and the heat recovery unit such that the primary, secondary and/or tertiary air can be heated using the heat in the flue gases flowing from the outlet for further combusted flue gases of the second burning zone.

In one embodiment the gas mixing unit is a gas ejector. In one embodiment the system further comprises a fan having an inlet connected to the outlet for cold flue gases of the heat recovery unit and an outlet connected to the inlet for cold flue gases of the mixing unit. In one embodiment the torrefaction reactor comprises at least a first and a second inlet for partially cooled flue gases and the first inlet for partially cooled flue gases is located in an upstream region of the torrefaction reactor and the second inlet for partially cooledflue gases is located in a downstream region of the torrefaction reactor. For example the said first inlet can be located in the first quarter of the torrefaction reactor and the second inlet can be located in the last quarter of the torrefaction reactor. The first quarter of the torrefaction reactor shall be interpreted as the quarter closest to the biomass inlet of the reactor and the last quarter to the quarter closest to the biomass outlet of the torrefaction reactor. In one embodiment the at least one outlet for torrefaction gases of the torrefaction reactor is located in between the first and a second inlet for hot flue gases. The at least one outlet for torrefaction gases can for example be located at a position corresponding to somewhere in the second or third quarter of the torrefaction reactor. In one embodiment the system is further comprising an oxygen supply means for a controlled supply of an oxygen-containing gas to the torrefaction reactor via the second inlet for hot flue gases.

In one embodiment the system is further comprising a pre-drier having
   means for heating
   an inlet for raw biomass and
   an outlet for pre-dried biomass
wherein the outlet for pre-dried biomass is connected to the biomass inlet of the torrefaction reactor In one embodiment the heat recovery unit comprises a heat exchanger which is connected to the means of heating of the pre-drier such that heat-energy recovered in the heat recovery unit can be used for heating the biomass within the pre-drier. In one embodiment the heat recovery unit is a boiler. In one embodiment the system is further comprising a chimney connected to the outlet for cold flue gases of the heat recovery unit such that cold flue gases which are not directed to the gas mixing unit can exit the system via the said chimney. In one embodiment the torrefaction reactor comprises a helicoid screw or a flight conveyor for transporting the optionally pre-dried biomass from the biomass inlet to the biomass outlet. In one embodiment the helicoid screw is a helicoid screw flight or a helicoid screw flighting welded on a central pipe or a helicoidal screw feeder. In one embodiment the system is further comprises a cooling device having an inlet for hot torrefied biomass and an outlet for cooled torrefied biomass wherein the inlet for hot torrefied biomass is connected to the biomass outlet of the torrefaction reactor The embodiments of the first, second, third, and forth aspects applies to each other mutatis mutandis.

DETAILED DESCRIPTION OF EXEMPLARY EMBODIMENTS

Example 1

FIG. 1 shows a number of flows and temperatures during torrefaction using the present invention. The x-axis shows the time in seconds, the left y-axis shows the temperature in degrees Celsius and the right y-axis shows the flow in actual liters per minute. Curve (1) shows the temperature in the torrefaction reactor, curve (2) shows the flow of flue gases that is added to the reactor divided by a factor of 10, curve (3) shows the cooling gas that is added to the mixing unit. In this experiment nitrogen gas was used as cooling gas to mimic cold flue gas. Curve (4) show the temperature of the flue gases that is added to the reactor divided by a factor of 2. The diagram in FIG. 1 clearly shows that the temperature in the torrefaction reactor can be controlled and stabilized by regulating the flow and temperature of flue gases added to the reactor. This can be seen at time 22000 seconds by the addition of cooling gas, increasing the hot gas flow to the reactor which in turn increases the torrefaction temperature. The fluctuations of the flue gas temperature from 25000 to 35000 seconds is the result of changing proportions between secondary and tertiary air and settling time of the process.

Example 2

Figure 2:
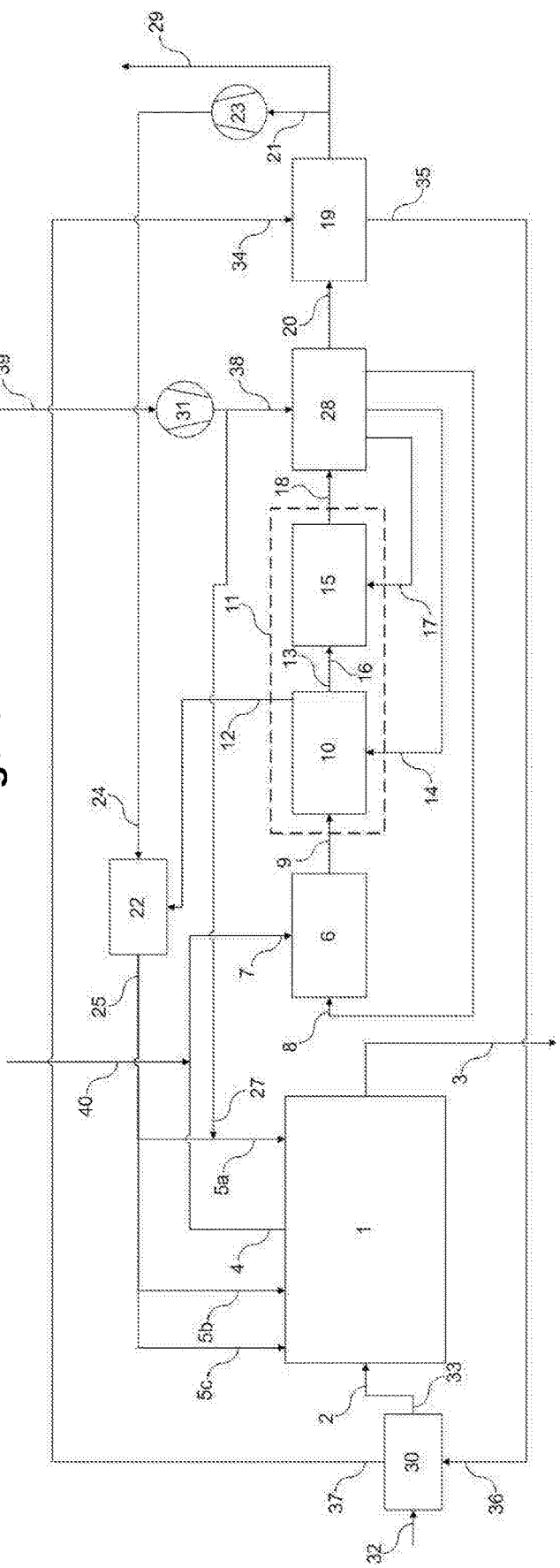
FIG. 2 shows an example of a system for torrefaction of biomass and combustion of generated torrefaction gases according to the present invention.

FIG. 2 discloses a torrefaction reactor (1) for torrefying a pre-dried biomass. The biomass dryer has a biomass inlet (32) and a biomass outlet (33), the biomass is transported through the biomass dryer (30) from the inlet (32) to the outlet (33). The biomass outlet (33) is connected to the biomass inlet (2) at the torrefaction reactor (1). Said torrefaction reactor (1) has a biomass inlet (2) and a biomass outlet (3). The biomass can be transported from the biomass inlet (2) to the biomass outlet (3) in a biomass transport direction during a torrefaction process. The torrefaction reactor further comprises an outlet for torrefaction gases (4), and three different inlets for partially cooled flue gases (5a, 5b, 5c) leading in to the torrefaction reactor (1) such that hot flue gas entering the said inlets (5a, 5b, 5c) can come into direct contact with biomass present within the torrefaction reactor (1). The system is further comprising an ejector burner (6). Said ejector burner (6) is comprising an inlet for torrefaction gases (7), an inlet for primary air (8), and an outlet for an air/torrefaction gas mixture (9). The inlet for torrefaction gas (7) of the ejector burner (6) is connected to the outlet for torrefaction gas (4) of the torrefaction reactor such that torrefaction gas can be withdrawn from the torrefaction reactor (1) to the ejector burner (6) and be mixed with primary air within the ejector burner (6). The system is further comprising a first burning zone (10) located within a burning chamber (11). The burning zone (10) is located immediately downstream of the outlet for an air/torrefaction gas mixture (9) of the ejector burner (6) such that the air/torrefaction gas mixture can flow through the ejector burner (6) into the first burning zone (10). The first burning zone (10) further comprises a first outlet for hot flue gases (12) and a second outlet for hot flue gases (13). The first burning zone (10) also have an inlet for secondary air (14) such that air can be directed into the first burning zone (10) for combustion of the torrefaction gases present in the first torrefaction zone (10). Part of the flue gases generated by the combustion of torrefaction gas in the first burning zone (10) is withdrawn via the first outlet for hot flue gases (12) and the rest of the flue gases are withdrawn via the second outlet for hot flue gases (13). In this embodiment the second outlet for hot flue gases (12) is a constriction within the burning chamber (11) which separates the first burning zone (10) from a second burning zone (15). Thus the constriction within the burning chamber also constitutes an inlet for hot flue gases (16) of the second burning zone such that hot flue gases from the first burning zone (10) is flowing into the second burning zone (15) through the constriction of the burning chamber (11). The second burning zone (15) further comprises an inlet for tertiary air (17). In the first burning zone (10) the torrefaction gas is combusted at sub-stoichiometric levels and thus part of the torrefaction gas is not fully combusted. In the second burning zone (15) air is introduced via the inlet for tertiary air (17) at or over stoichiometric rates such that the torrefaction gas is fully combusted. The flue gas generated at this step exits the burning chamber (11) via an outlet for further combusted flue gases (18) present in the second burning zone (15) of the burning chamber (11). This hot flue gas is thereafter directed to an air pre heater (28) where the flue gas is cooled before entering the boiler (19) through inlet (20) connected to the air pre heater (28) and an outlet for cold flue gases (21). The cold flue gases are directed to a gas ejector (22) by means of a fan (23) located in between the gas ejector (22) and the boiler (20). The cold flue gas flows into the gas ejector (22) via an inlet for cold flue gases (24) of the gas ejector (22) where it is mixed with the hot flue gases withdrawn from the first outlet for hot flue gases (12) of the first burning zone (10). Said hot flue gases flows into the gas ejector via an inlet for hot flue gases (25) of the gas ejector (22). The mixture of hot and cold flue gases can have a temperature of about 600-1000° C. These gases flows from the gas ejector (22) via an outlet for partially cooled flue gases (26), and is introduced into the torrefaction reactor (1) via the inlets for partially cooled flue gases (5a, 5b, 5c). The system further comprises oxygen supply means (27) for a controlled supply of an oxygen-containing gas to the torrefaction reactor via the inlet for partially cooled flue gases (5a) located in a downstream part of the torrefaction reactor (1). The system further comprises an air pre-heater (28) for heating the primary, secondary and tertiary air. The air pre-heater (28) located in between the second burning zone (15) and the boiler (19) such that the primary, secondary and/or tertiary air can be heated using the heat in the flue gases flowing from the outlet for further combusted flue gases (18) of the second burning zone (15). The cool air to the air pre-heater (28) comes from the air fan (31). The air fan (31) has an air inlet (39) and the air fan outlet (38) is connected to the air pre heater (28). Cold gas which is not used for circulation of partially cooled flue gases within the system is diverted from the boiler (20) to a chimney (29). In the boiler (19) the flue gases transfers heat to a heat transferring medium that exits the boiler (19) through the heat transferring medium outlet (35) that is connected to the biomass dryer (30) through the heat transferring medium inlet (36). The heat transfer media is cooled in the biomass dryer (30) before exiting through the heat media transferring outlet (37) which is connected to the heat transfer media inlet (34) at the boiler (19). To be able to increase the heating value of the combustible gases that goes into the ejector burner (6) through the inlet for torrefaction gases (7), propane can be added to the torrefaction gas pipe through the propane inlet (40) located between the inlet for torrefaction gases (7) and the outlet for torrefaction gases (4).

REFERENCES

[1] M. J Prins et al. More efficient biomass gasification via torrefaction. Energy 2006, 31, (15), 3458-3470.

[2] P. C. A. Bergman et al. Torrefaction for Entrained Flow Gasification of Biomass; Report C-05-067; Energy Research Centre of The Netherlands (ECN): Petten, The Netherlands, July 2005;

[3] K. Håkansson et al. Torrefaction and gasification of hydrolysis residue. 16th European biomass conference and exhibition, Valencia, Spain. ETAFlorence, 2008.

[4] A. Nordin, L. Pommer, I. Olofsson, K. Håkansson, M. Nordwaeger, S. Wiklund Lindström, M. Broström, T. Lestander, H. Örberg, G. Kalén, Swedish Torrefaction R&D program. First Annual Report 2009-12-18 (2009).

The invention claimed is:

1. A method for torrefaction of lignocellulosic biomass and combustion of generated torrefaction gases comprising the steps of:
  a) torrefaction of pre-dried lignocellulosic biomass in a torrefaction reactor such that torrefied biomass and torrefaction gases are obtained;
  b) withdrawal of torrefaction gases from the torrefaction reactor to an ejector burner by means of an under pressure created by a primary stream of air flowing through the ejector burner and into a first burning zone;
  c) flowing a secondary stream of air into the first burning zone to at least partially combust the withdrawn torrefaction gases at sub-stoichiometric oxygen rates such that hot flue gases are obtained;
  d) dividing the hot flue gases obtained in step c) into a first stream of hot flue gases and a second stream of hot flue gases by diverting the first stream of hot flue gases from the first burning zone to a gas mixing unit;
  e) diverting the second stream of hot flue gases to a second burning zone;
  f) flowing a tertiary stream of air, at or over stoichiometric oxygen rates, into the second burning zone to further combust the second stream of hot flue gases to obtain a stream of further combusted flue gases;
  g) diverting the stream of further combusted flue gases to a heat recovery unit wherein the temperature of the stream of further combusted flue gases obtained in step f) is decreased such that a stream of cold flue gases is obtained;
  h) diverting a part of the cold flue gases obtained in step g) to the gas mixing unit such that the stream of cold flue gases mixes with the first stream of hot flue gases such that a stream of partially cooled flue gases is obtained; and
  i) diverting the stream of partially cooled flue gases obtained in step h) into the torrefaction reactor such that the pre-dried lignocellulosic biomass comes into direct contact with the stream of partially cooled flue gases such that the pre-dried lignocellulosic biomass is directly heated by the stream of partially cooled flue gases, wherein the cold flue gases obtained in step g) is directed to the gas mixing unit via a fan arranged in between the heat recovery unit and the gas mixing unit.

2. The method according to claim 1, wherein the hot flue gases obtained in step c) have a temperature of above 850° C.

3. The method according to claim 1, wherein the cold flue gases obtained in step g) has a temperature of 60-300° C.

4. The method according to claim 1, wherein the stream of partially cooled flue gases obtained in step h) has a temperature of 600-1000° C.

5. The method according to claim 1, wherein the torrefaction gas present in the hot flue gases obtained in step c) is completely combusted in step f).

6. The method according to claim 1, wherein the primary stream of air, the secondary stream of air and/or the tertiary stream of air is pre-heated in an air heater located downstream of the second burning zone but upstream of the heat recovery unit and wherein the air is heated using heat energy from the stream of further combusted flue gases obtained in step f).

7. The method according to claim 1, wherein the hot flue gases obtained in step c) have a temperature of above 900° C.

8. The method according to claim 1, wherein the hot flue gases obtained in step c) have a temperature of above 1000° C.

* * * * *